(No Model.)

A. L. HAHL.
VELOCIPEDE.

No. 503,080. Patented Aug. 8, 1893.

Witnesses:
Jas. E. Hutchinson.
Henry C. Hazard.

Inventor.
Augustus L. Hahl
by Prindle and Russell
his attorneys.

UNITED STATES PATENT OFFICE.

AUGUSTUS L. HAHL, OF CHICAGO, ILLINOIS.

VELOCIPEDE.

SPECIFICATION forming part of Letters Patent No. 503,080, dated August 8, 1893.

Application filed July 18, 1892. Serial No. 440,332. (No model.)

*To all whom it may concern:*

Be it known that I, AUGUSTUS L. HAHL, a citizen of the United States, residing at Chicago, in the county of Cook, and in the State of Illinois, have invented certain new and useful Improvements in Velocipedes; and I do hereby declare that the following is a full, clear, and exact description thereof, reference being had to the accompanying drawings, in which—

Figure 1:
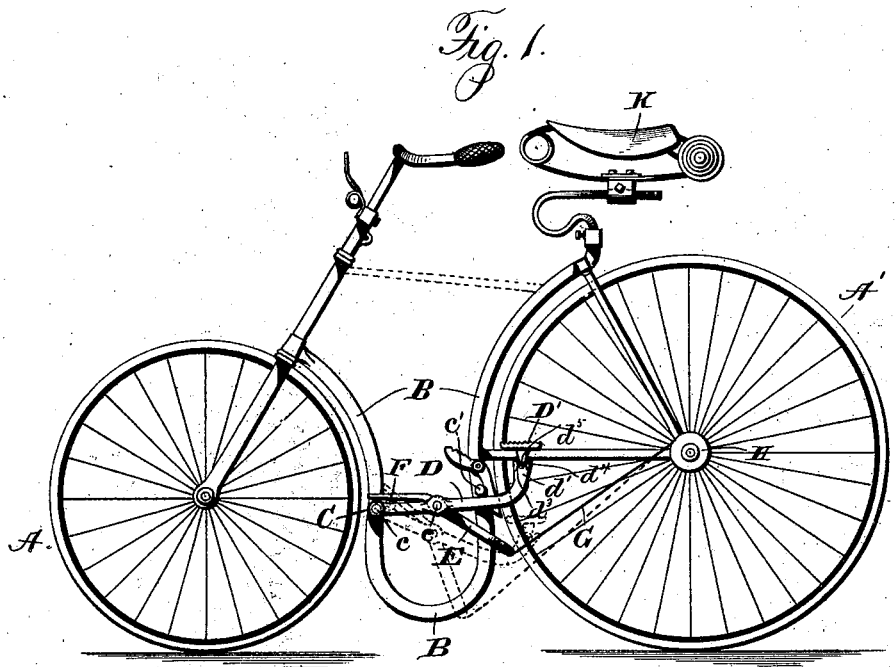
Figure 2:
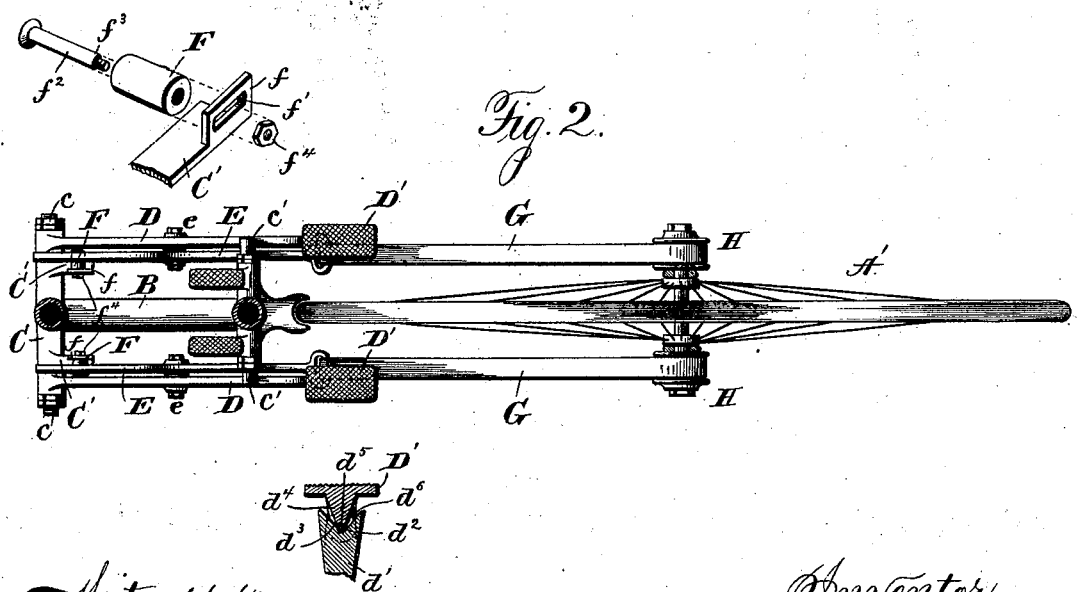

Figure 1 shows, in side elevation, a bicycle provided with my improved driving devices, and Fig. 2, shows a plan view of the bicycle, with the saddle, front wheel, the forward part of the frame, and the handles removed.

Letters of like name and kind refer to like parts in each of the figures.

The object of my invention is to provide improved driving devices for velocipedes and other machines, and, to this end, my invention consists in the mechanism and the parts thereof, constructed, arranged, and combined, as hereinafter specified.

While in the drawings my invention is shown as applied to a bicycle having its frame formed like that used in bicycles made for ladies' use, that is, with a downward bend extending well down between the front and rear wheels, I desire it to be understood, that I do not intend to limit myself to such application, as the invention is applicable and intended to be applied to velocipedes of other kinds, whether with two or more wheels.

The special purpose which I have had in view, in devising the present driving devices, has been to secure the desired extent of pulling out of each drum strap, with a short throw of the pedal lever, and a very nearly straight up and down movement of the pedal, and to make the extent of such pulling out adjustable, so that it can be, at will, increased, to secure greater speed of rotation of the strap drum and connected and diminished, to secure greater power and less speed, without change in the throw of the pedal lever.

In the drawings A and A', designate, respectively, the front and rear wheels of the machine, and B, designates the frame which, as shown, has the downward bend between the wheels, to suit it for ladies' use, but can be of any other form having a portion or arm situated well down behind the front wheel A. Attached to or made in one piece with this frame, at a point near the front wheel, and, preferably, below the level of the axle of the rear wheel, are the brackets C, C, carrying the pivots $c, c,$ of the pedal levers D, D, which, from their pivotal ends, extend rearward on opposite sides of the frame and the rear wheel.

On an upwardly extending arm $d'$ of each lever is the pedal D', which is so situated, that, when the arm is in its extreme elevated position, it will stand above the level of the lever pivot. With this construction the pedal, and, consequently, the foot resting on the same, will travel slightly away from and then toward a vertical line, as the pedal lever is swung down throughout its strap drawing movement, and will not have only a forward and downward motion, such as would be necessary with the pedal on a lever with or below the lever pivot. The pedals can, since the levers only swing, be made to rock instead of rotate. They are to avoid friction, preferably supported on the levers by means of knife edge bearings, each consisting of a V-shaped piece $d^2$, which rests in a correspondingly shaped groove $d^3$, on the upper end of arm $d'$. Such groove is, of course, wider, and has its sides at greater angles to each other, than piece $d^2$, to make room for the rocking of the latter.

To prevent the pedals from getting out of place during use, each one can be provided with the two downwardly extending arms $d^4$, $d^4$, on each side of arm $d'$, engaging pins or pivots situated on upwardly extending lugs $d^5$, $d^5$, from arm $d'$, in line with the axis of the swing of the pedal on its bearings. The latter, and not these pins, will be the support for the pedal, and no weight or friction will be brought to bear on said pins, as the pedal is forced down to depress the respective pedal lever.

To check the upward swing of the pedal levers, at the desired upper limit, I contemplate providing, either the brackets C, C, or some other part of the frame B, with stops $c'$, $c'$, of any desired form or construction.

Pivoted to each pedal lever at a point, $e$, is a lever E, whose forwardly extending arm rests upon a bearing F, on one of the brackets C. Its other arm is arranged to extend downward and rearward to a point well below the pedal lever, and has, attached to its end, the band or strap G, which runs upward and rearward to the drum H to be driven. This latter device can be of any of the well known forms of strap drums, connected with the rear wheel or axle thereof in any desired way, and provided with the usual spring to turn it back, and wind up the strap, when the latter has been drawn out by pressure on the pedal lever, and such pressure has been removed. I have not shown the internal structure of such drum, or the means for connecting it with the wheel and winding it back, as my present invention has nothing to do therewith.

The bearing F, upon which the forward arm of each lever E bears, is situated eccentrically with reference to the axis of motion of the pedal lever, and preferably at a point between the pivot of such lever, and that of lever E, as shown in the drawings, so that, as the pedal lever is depressed, to carry pivot $e$ down, the forward arm of lever E will be held up and, consequently, the latter lever will be swung downward faster and farther than the pedal lever. The movement of each pedal lever is thus multiplied, the respective straps G being drawn out quickly to the desired extent, with but little downward motion of the pedal.

To prevent friction between the lever E and bearing F, the latter is preferably made in the form of a roller journaled on a bearing on the respective bracket C.

In order that the amount of swing of the lever E, as the respective pedal lever is depressed, may be increased or diminished, according as increase in speed or power is desired, I make this bearing F adjustable toward and from the pivot of lever E. The construction of the bearing for this purpose can be varied without departure from my invention. That shown, has an arm projecting rearward from the respective bracket C', provided with an upturned longitudinally extending part $f$, which has in it a longitudinal slot $f'$, a pin $f^2$ forming the journal upon which the roller rotates, having a shoulder to engage the inner face of part $f$, and a thicker shank $f^3$ extending through the slot, and a nut $f^4$, on such shank engaging the side of part $f$, away from the shoulder on the pin.

As shown in the drawings, each lever E, is to be so bent or shaped, that, when the respective pedal lever is in its normal raised position, with the pedal well above the level of the pedal lever pivot, its end, to which the drum strap is attached, will be well below a line between said pivot and the part of the drum from which the strap passes to the lever, and the strap will, consequently, extend downward, as well as forward to its point of attachment to lever E. With this construction there will be no lost motion, as there would be, were such point of attachment above, or on said line between the pedal lever pivot and the drum, and, therefore, the first movement of the pedal lever will cause a positive drawing out of the strap, to rotate the respective drum. If preferred the connection between each lever E, and its drum, can be, instead of a single strap, two narrow ones or cords, attached to arms $e'$, $e'$, on opposite sides of the lever end, and wound upon different portions of the drum.

The operation of my driving devices, constructed as shown and described, is briefly as follows:—With a pedal lever raised to its extreme elevated position, with its pedal well above the level of the lever pivot, as shown in full lines in Fig. 1, the foot of the rider, who occupies the saddle K, will, as it moves downward to depress the pedal lever to its fullest extent, move nearly in a straight line and not entirely downward and forward, as it would have to, if the pedal were, when elevated, situated at or below the level of the lever pivot. The line of travel of the pedal is, of course really a curved one, but, as it is one which first goes from and then toward a vertical line, it is substantially a straight up and down one, causing a most easy and comfortable movement of the foot driving the lever. As the pedal lever descends, the lever E is, because of the depression of its pivot, while its forward end is held elevated by the bearing F, upon which it rests, made to swing upon and with reference to the pedal lever, so that its end, to which the drum strap is attached, moves faster and farther than the pedal end of the pedal lever; so that a short downward travel of the latter will bring the strap end of lever E, down to the point shown in dotted lines, and cause a much greater pulling out of the strap, than could be obtained were the latter attached to any part of the pedal lever itself. The extent of the travel of the lever E, with reference to the pedal lever, can be increased or diminished, to secure greater speed, or less speed and more leverage for the driving power, by simply loosening the nut $f^4$, moving the roller journal toward or from the pivot $e$ of lever E, and then screwing up the nut again, to fasten the bearing as adjusted. This adjustment affords ready means for adapting the machine, at will, for speeding, or for use, where power more than speed is needed, as in climbing hills, or going over rough roads. If it should be desired to have the bearing F, capable of being adjusted, so that the outer end of lever E, would have only the motion of the pedal lever, said bearing can, of course, be made, so that at the forward end of its movement the end of lever E engaging it, will simply travel around it, in a line concentric with the swing of the pedal lever; but I prefer to have it so arranged, that it will always cause an excess of motion of the strap lever, over that of the pedal one, the extent of such excess being adjustable from a small to a large amount, so that the machine may be well adapted for use by a weak rider, who will need the greatest possible leverage for his power applied to the pulling out of the drum strap, or by a powerful one, who may desire to use his whole strength to the greatest advantage in speeding, or at times in speeding, and at other times in climbing hills, or traveling rough roads.

As will be seen from the description and drawings, my driving devices are extremely simple in construction, capable of being made strong to resist the strain and wear of any use, not liable to get out of order, and well adapted, with a comparatively small movement of the feet, of such a nature, as will involve only a comfortable and healthful motion of both legs and feet, to secure a long pull-out of the respective drum straps.

Having thus described my invention, what I claim is—

1. In a driving device for velocipedes and the like, in combination with the strap and the lever to which the driving power is to be applied, the second lever pivoted to the latter, and having the strap attached to one of its arms, a bearing engaged by without being attached to the other arm of the lever, adapted to detain such arm, as the driving lever is swung on its pivot, substantially as and for the purpose specified.

2. In a driving device for velocipedes and the like, in combination with the strap, and the lever to which the driving power is to be applied, the second lever pivoted to the latter, and having the strap attached to one of its arms, and the bearing for engaging and detaining the other arm, as the first lever swings, made adjustable toward and from the pivotal point of the second lever, substantially as and for the purpose shown.

3. In a driving device for velocipedes and the like, in combination with the strap and the lever to which the driving power is to be applied, the second lever pivoted to the first one, and having the straps connected with one of its arms, and the roller, on a support independent of either lever, engaging the other arm of the second lever, at a point between the pivotal connection between the levers, and the pivot of the first lever substantially as and for the purpose set forth.

4. In a velocipede in combination with the wheel to be driven, and a suitable frame, the strap drum connected with the wheel, a lever pivoted directly to the frame, and extending toward the drum, a second lever pivoted to the first lever, the strap connected with the rearwardly extending arm of the second lever, and wound upon the drum, and a bearing, independent of the levers, engaging the forward arm of the second lever, so as to detain such arm; as the first lever is depressed, substantially as and for the purpose described.

5. In a velocipede in combination with the wheel to be driven, and a suitable frame, the strap drum connected with the wheel, the pedal lever pivoted to the frame, the second lever pivoted to the pedal lever, the strap wound upon the drum and connected with one arm of the second lever, and the bearing engaging the other arm of such lever, made adjustable toward and from the pivot of the second lever, on a support independent of either lever, substantially as and for the purpose specified.

6. In a velocipede in combination with a suitable frame, the wheel to be driven, and the strap drum connected with such wheel, the pedal lever pivoted directly to the frame and extending rearward therefrom, the second lever pivoted to the pedal lever, the strap wrapped upon the drum and connected with the rear arm of the second lever, and a roller bearing, on a support independent of the levers, engaged by the forward arm of second lever, substantially as and for the purpose shown.

7. In a velocipede, in combination with a suitable frame, the wheel to be driven, and the strap drum connected with such wheel, the pedal lever pivoted to the frame, and extending rearward toward the drum, and having its pedal or foot piece above the level of the lever pivot, when such lever is raised, the second lever pivoted to the pedal lever having its rear arm extending rearward, to a point below a line between the pedal lever pivot and the drum, a strap wrapped on the drum, and connected with the second lever below such line, and a bearing independent of the levers upon which the forward arm of the second lever rests, at a point between the pivots of the two levers, substantially as and for the purpose set forth.

8. In a velocipede, in combination with a suitable frame, the wheel to be driven, and the strap drum connected with such wheel, the pedal lever pivoted to the frame, the second lever pivoted to the pedal lever, and having an end extended to a point below the foot engaging part of the pedal lever, and the strap connecting such portion of said second lever, and the drum, substantially as and for the purpose shown.

In testimony that I claim the foregoing I have hereunto set my hand this 11th day of June, A. D. 1892.

AUGUSTUS L. HAHL.

Witnesses:
L. BRINCKERHOFF,
PORTER B. FITZGERALD.